(12) United States Patent
Sanchez Ramirez

(10) Patent No.: US 9,671,963 B2
(45) Date of Patent: Jun. 6, 2017

(54) DATA STORAGE DEVICE

(71) Applicant: Jose Carlos Sanchez Ramirez, Madrid (ES)

(72) Inventor: Jose Carlos Sanchez Ramirez, Madrid (ES)

( * ) Notice: Subject to any disclaimer, the term of this patent is extended or adjusted under 35 U.S.C. 154(b) by 0 days.

(21) Appl. No.: 14/781,548

(22) PCT Filed: Mar. 6, 2014

(86) PCT No.: PCT/ES2014/070166
§ 371 (c)(1),
(2) Date: Sep. 30, 2015

(87) PCT Pub. No.: WO2014/162024
PCT Pub. Date: Oct. 9, 2014

(65) Prior Publication Data
US 2016/0048346 A1     Feb. 18, 2016

(30) Foreign Application Priority Data

Apr. 1, 2013   (ES) ................................ 201330381 U

(51) Int. Cl.
| | |
|---|---|
| *G06F 3/00* | (2006.01) |
| *G06F 3/06* | (2006.01) |
| *G06F 13/00* | (2006.01) |
| *G06F 13/40* | (2006.01) |

(52) U.S. Cl.
CPC ............ *G06F 3/0613* (2013.01); *G06F 3/067* (2013.01); *G06F 3/0658* (2013.01); *G06F 3/0665* (2013.01); *G06F 3/0689* (2013.01); *G06F 13/00* (2013.01); *G06F 13/4022* (2013.01)

(58) Field of Classification Search
CPC ............................ G06F 3/0613; G06F 3/0665

USPC ......................................................... 711/114
See application file for complete search history.

(56) References Cited

U.S. PATENT DOCUMENTS

| | | | |
|---|---|---|---|
| 2003/0135609 A1 | 7/2003 | Carlson et al. | |
| 2004/0111580 A1* | 6/2004 | Weber .................. | G06F 3/0607 711/173 |
| 2013/0051393 A1 | 2/2013 | Gavrilov et al. | |

OTHER PUBLICATIONS

InfiniBand Switch System Family, Mellanox Technologies, 8 pages, https://web.archive.org/web/20130509190436/http://www.mellanox.com/pdf/products/SwitchSystem_Brochure.pdf.

* cited by examiner

*Primary Examiner* — Jae Yu
(74) *Attorney, Agent, or Firm* — Dickinson Wright PLLC

(57) ABSTRACT

The object of the invention is to provide a data storage device which is extremely effective, scalable, and with fast access to the data. At least two front components (1-1') participate therein, wherebetween a plurality of nodes (2-2'-2" . . . 2n) are connected in parallel by means of an Infiniband (IB) network (3), so that each front component incorporates a series of internal (4) being and external (5) channels, with the internal channels responsible for providing access to the nodes (2-2'-2" . . . 2n), which will all of them be of Infiniband (IB)-type at different speeds 40/56/100 Gbits/s, and the external channels (5) provide the connectivity with the clients may be materialized in Ethernet channels at different speeds 1/10/40 Gbits/s, Fiber Channel (FC) channels or Infiniband channels at different speeds 40/56/100 Gbits/s. The nodes (2) are materialized in a grouping of data storage disks (6) interconnected by an Infiniband (IB)-type network.

5 Claims, 6 Drawing Sheets

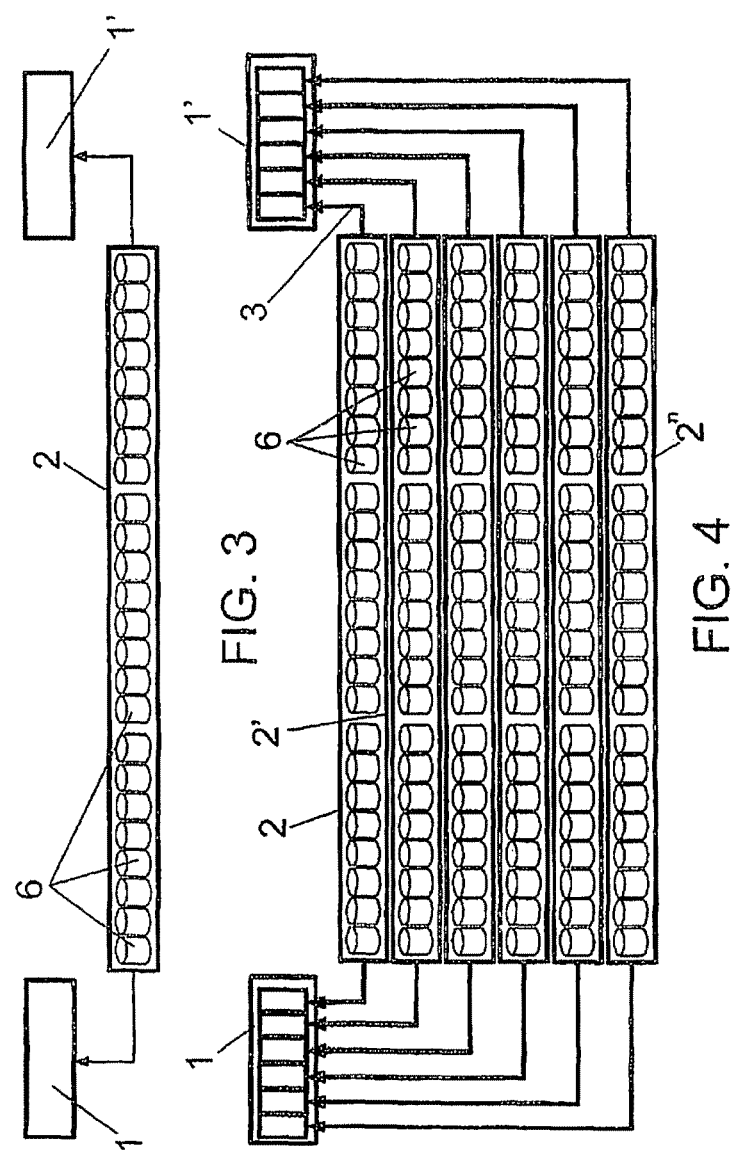

DATA STORAGE DEVICE

OBJECT OF THE INVENTION

The present invention relates to a data storage device, composed of 2 or 4 controller systems which manage access to systems which contain the disks where the information is stored.

The object of the invention is to provide a data storage device which is extremely effective, scalable, and with fast access to the data by the users.

BACKGROUND OF THE INVENTION

As is known, there is at present an infinity of storage devices and systems, wherein controller systems participate wherethrough the access to systems containing the data storage disks is managed.

To date, this type of devices/systems has an internal interconnection which is carried out by means of "Serial Attached SCSI (SAS)", a connection which is slow and ineffective against the solution which the invention proposes.

DESCRIPTION OF THE INVENTION

The device claimed has been devised to resolve the aforementioned problems, in a simple but highly effective way.

To do this, the device claimed is formed from at least two front components wherebetween are connected in parallel a series of nodes, which are materialized in turn in a grouping of data storage disks, so that, each node has two IB (infiniband) channels of 40, 56 or 100 Gbits/sec.

Thus, the storage size varies depending on the number of nodes, on the amount of disks and on their size.

More particularly, front components are formed from two parts, an external part whereto are connected the clients which require storage and an internal part which is where the systems which have the storage formed by the nodes are connected.

Consequently, a series of internal and external channels are defined for each front component, wherein, the internal channels are responsible for providing access to the nodes, from Infiniband "IB" technology at different speeds.

For their part, the external channels are responsible for providing connectivity with the clients, and can be materialized in Ethernet channels at different speeds, Fiber Channel (FC) channels at different speeds or Infiniband channels at different speeds.

The equipment has network cards for its management, as well as disks to start-up and save the configuration, and it may have additional storage for its internal management.

In parallel, each node has a CPU and memory to manage access to the disks from the IB Infiniband) network.

Likewise, each node has a network connection to perform administrative tasks, as well as three internal controllers of 8 channels each.

The disks used shall be preferably of SSD-type (Solid State Drive), having independent disks which provide the start-up of the system.

DESCRIPTION OF THE DRAWINGS

To complement the description that will be made below, and with the aim of aiding towards a better understanding of the characteristics of the invention, in accordance with a preferred example of practical embodiment thereof, a set of drawings is attached as an integral part of said description, wherein with illustrative and non-limiting character, the following has been represented:

FIG. 3. Shows a detail of the internal structure of a node.

FIG. 4. Shows the assembly of the figure detailing the structure of the six nodes which participate in said example of embodiment.

PREFERRED EMBODIMENT OF THE INVENTION

Figure 1:
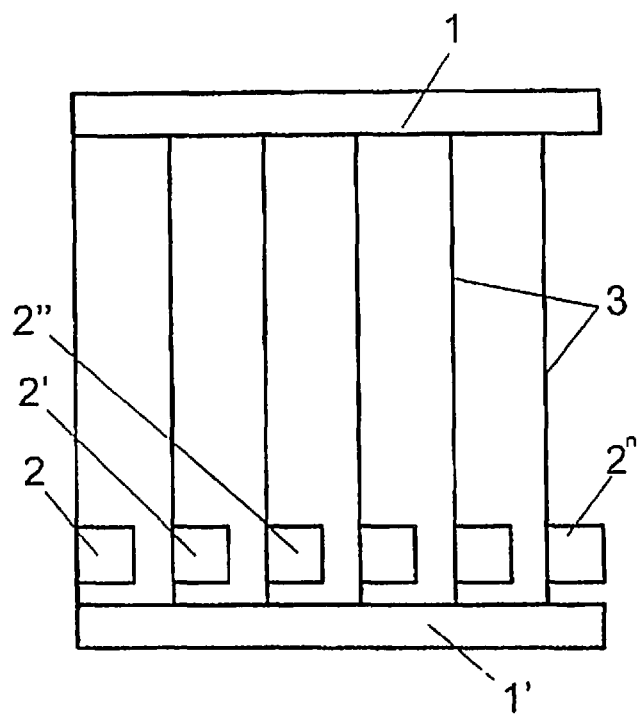
FIG. 1. Shows a block diagram of a data storage device configured with six nodes, made in accordance with the object of the present invention.
Figure 8:
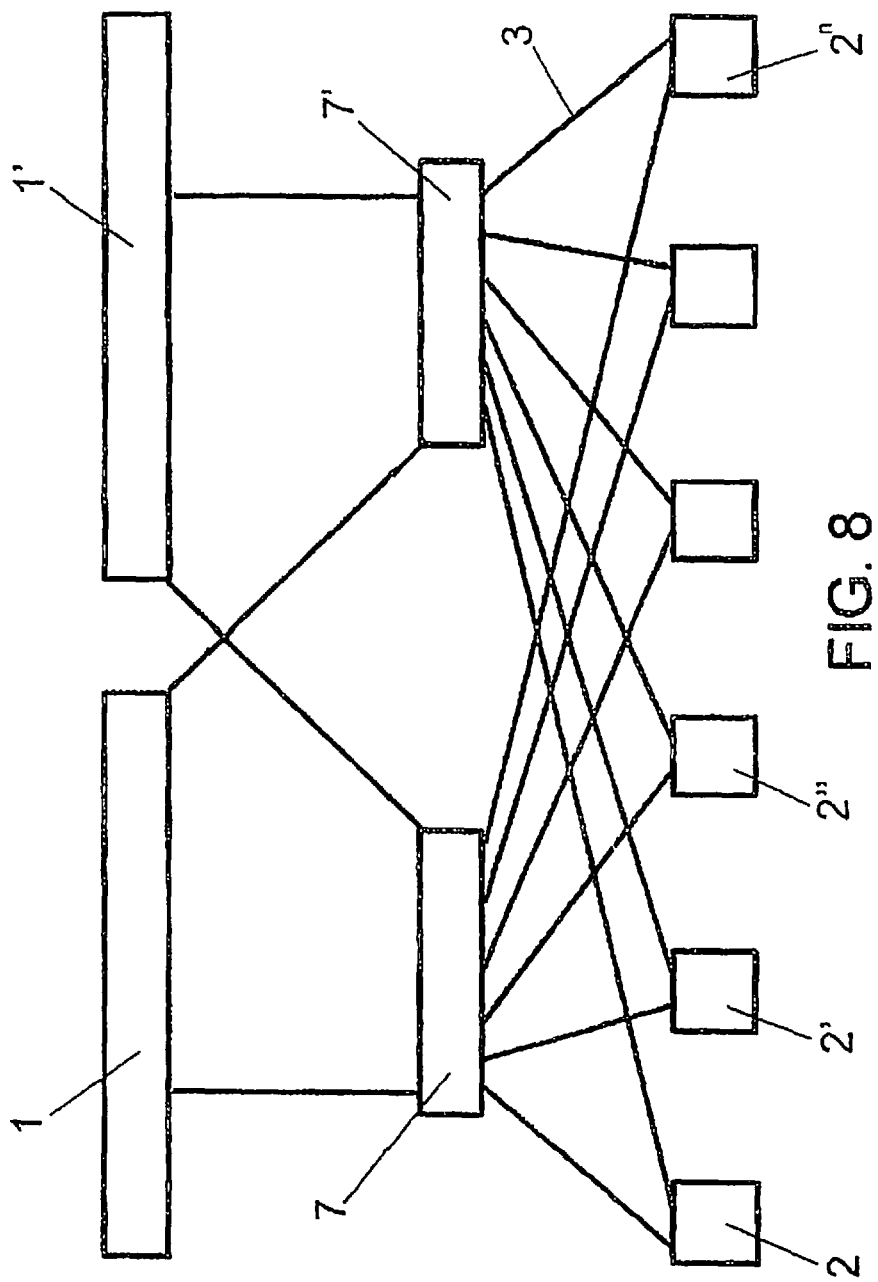
FIG. 8. Shows a more detailed developed of the mode of connection of FIG. 1.

In light of the described figures, and in particular FIG. 1, it can be observed how in the device claimed, at least two front components (1-1') participate wherebetween a plurality of nodes (2-2'-2'' ... 2''') are connected in parallel by means of an Infiniband (IS) network (3). More particularly, FIG. 8 shows the connection diagram in greater detail, through the corresponding "switches" (7-7') associated to the front components (1-1').

Figure 2:
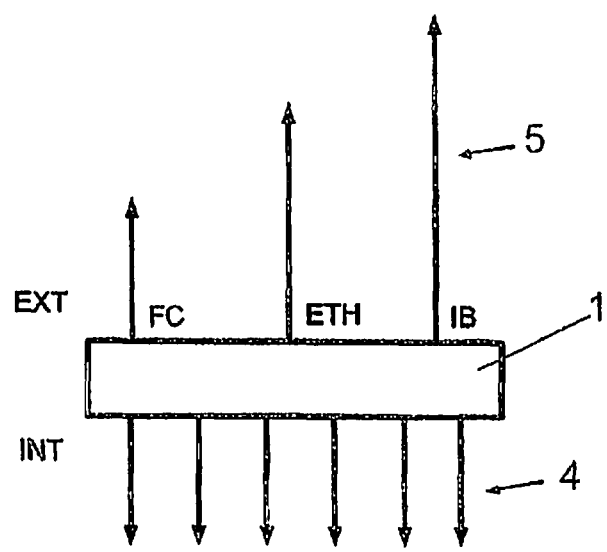
FIG. 2. Shows a detail of the configuration of the front components.

According to FIG. 2, it can be observed how each front component incorporates a series of internal channels (4) and a series of external channels (5), so that the internal channels, responsible for providing access to the nodes {2-2'-211 will all be of Infiniband-type (IB} at different speeds 40/56/100 Gbits/s.

For their part, the external channels (5), responsible for providing the connectivity with the clients may be materialized in Ethernet channels at different speeds 1/10/40 Gbits/s, channels Fiber Channel {FC} at different speeds or Infiniband channels at different speeds 40/56/100 Gbits/s.

These components have network cards for management, as well as disks to start-up and save the configuration, and it is possible to have additional storage for the internal management.

Furthermore, and going on to FIG. 3, it can be observed how the nodes (2) consist of a grouping of disks (6), in the present case 24, grouped in three groups of 8 disks each.

Each node has a dual connection channel, through the corresponding front components (1-1').

Said nodes are integrated in a chassis, each one incorporating two Infiniband (IB)-type channels of 40, 56 or 100 Gbits/s.

In parallel, each node includes three internal controllers of 8 channels each.

They also have a CPU and memory to manage access to the disks from the IB network.

Each node has a network connection to perform administrative tasks, as well as independent disks which provide the start-up of the system.

In terms of the disks used, they shall preferably be of "Sold State Drive"-type (SSD).

Figure 5:
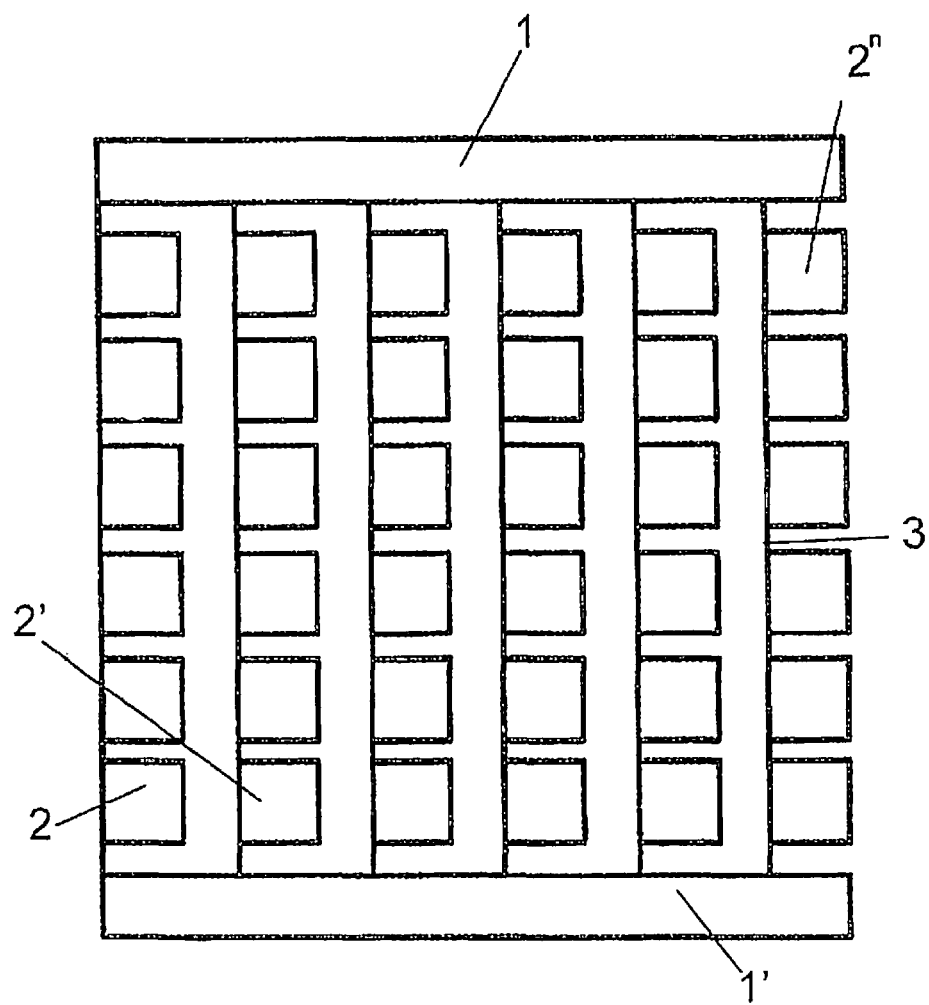
FIG. 5. Shows a schematic diagram of a second example of embodiment of the device of the invention, wherein 36 nodes participate.
Figure 6:
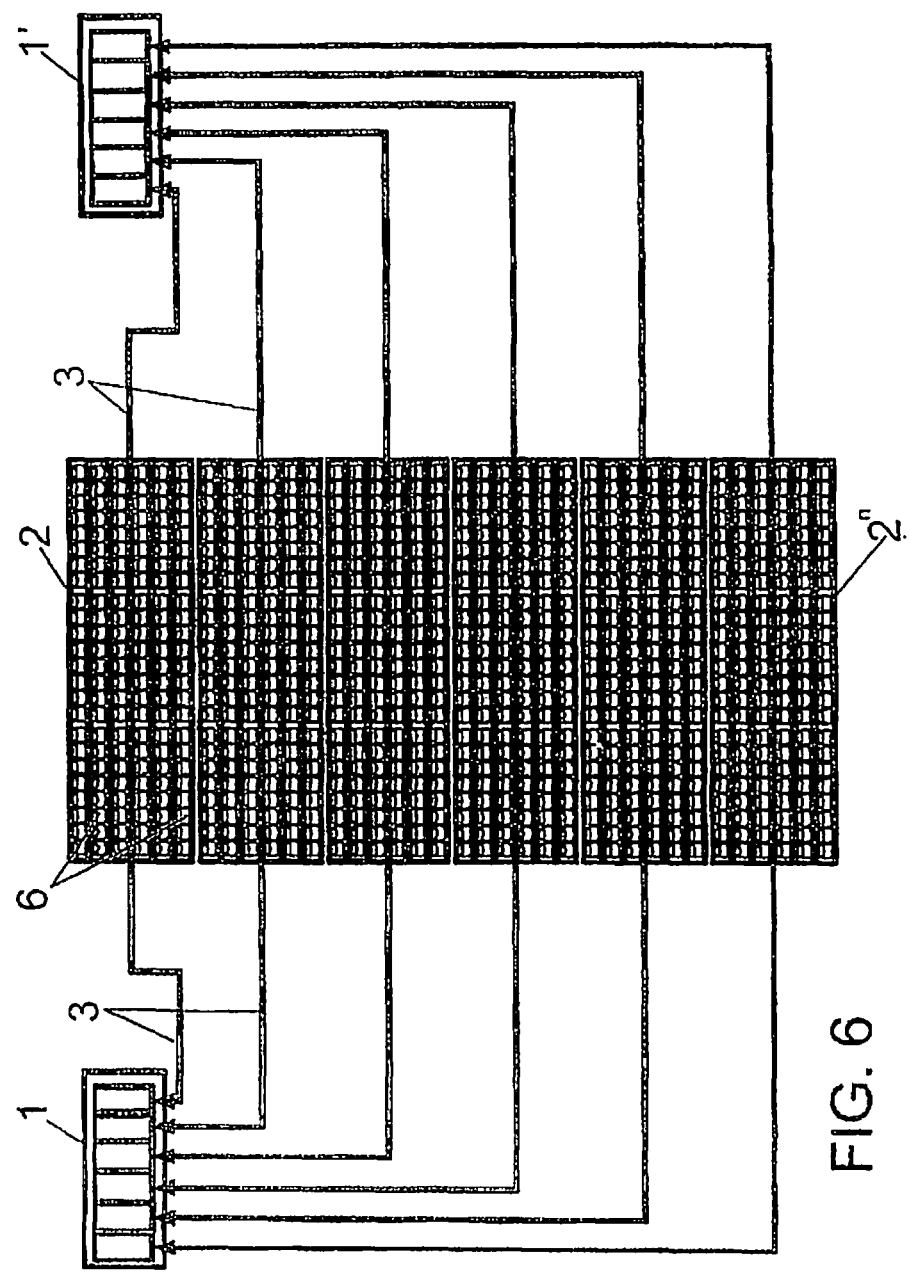
FIG. 6. Shows a detailed diagram of the assembly of the previous figure.
Figure 7:
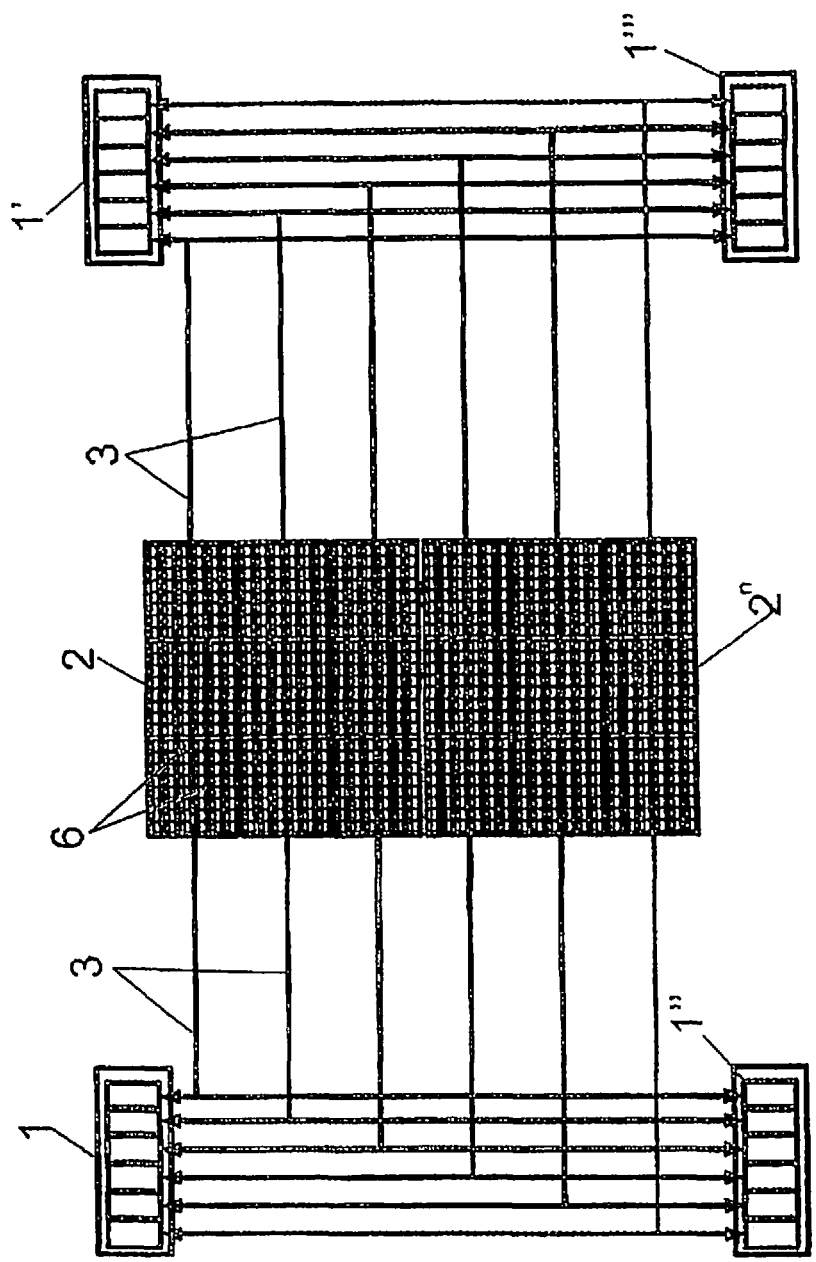
FIG. 7. Shows, a detailed diagram of another example of embodiment, wherein 4 front components and 36 nodes participate in the device.

From this structuring, and in accordance with FIGS. 4 to 7, the storage device can be implemented in various ways, depending on the number of nodes and front components which it incorporates, so that, FIG. 4 shows an example of a device with 2 front components and 6 nodes, whilst in FIGS. 5 and 6 a device is represented with 2 front components and 36 nodes, whilst, finally in FIG. 7 a device is represented with 4 front components and 36 nodes, it being evident that the possibilities of assembly for the device are highly varied.

The invention claimed is:

1. Data storage device, characterized in that at least two front components (1-1') are connected in parallel to a plurality of nodes (2-2'-2" . . . 2") in an Infiniband (IB) network (3), where each front component incorporates a series of internal channels (4) and a series of external channels (5), so that the internal channels, responsible for providing access to the nodes (2-2'-2" . . . 2") of Infiniband (IB)-type at different speeds 40/56/100 Gbits/s, whilst the external channels (5), responsible for providing the connectivity with clients by Ethernet channels at different speeds 1/10/40 Gbits/s, Fiber Channel (FC) channels at different speeds or Infiniband channels at different speeds 40/56/100 Gbits/s, having provided that the nodes (2) are a grouping of data storage disks (6) interconnected by the Infiniband (IB)-type network, and where each node has a dual connection channel through a corresponding front component and a CPU and have internal memory to manage access to the disks of the Infiniband network.

2. Data storage device, according to claim 1, wherein the front components have network cards for management, and disks to start-up and save the configuration, and additional storage means for the internal management.

3. Data storage device, according to claim 1, wherein each node includes three internal controllers of 8 channels each.

4. Data storage device, according to claim 1, wherein each node has a network connection to perform administrative tasks, and independent disks which provide the system start-up.

5. Data storage device, according to claim 1, wherein the disks used in the nodes are of "Solid State Drive" (SSD)-type.

* * * * *